US011156137B2

(12) United States Patent
Barreteau et al.

(10) Patent No.: US 11,156,137 B2
(45) Date of Patent: Oct. 26, 2021

(54) INSIDE-OUT ROTATING COALESCER WITH GAS EXIT THROUGH HOLLOW SHAFT

(71) Applicant: Cummins Filtration IP, Inc., Columbus, IN (US)

(72) Inventors: Anthony Barreteau, Quimper (FR); Christopher E. Holm, Madison, WI (US); Benjamin L. Scheckel, Stoughton, WI (US); Alain Olier, Pluguffan (FR)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 17/164,369

(22) Filed: Feb. 1, 2021

(65) Prior Publication Data

US 2021/0156286 A1 May 27, 2021

Related U.S. Application Data

(63) Continuation of application No. 16/903,160, filed on Jun. 16, 2020, now Pat. No. 10,927,730, which is a (Continued)

(51) Int. Cl.
*F01M 13/04* (2006.01)
*B01D 45/14* (2006.01)
(Continued)

(52) U.S. Cl.
CPC .............. *F01M 13/04* (2013.01); *B01D 45/14* (2013.01); *B01D 46/0005* (2013.01);
(Continued)

(58) Field of Classification Search
CPC ........... F01M 13/04; F01M 2013/0422; F01M 2013/0438; B01D 50/002; B01D 45/14;
(Continued)

(56) References Cited

U.S. PATENT DOCUMENTS 2,788,125 A   4/1957   Webb
2,905,327 A   9/1959   Phillps
(Continued)

FOREIGN PATENT DOCUMENTS

CN   101491793 A   7/2009
CN   101784325 A   7/2010
(Continued)

OTHER PUBLICATIONS

Chinese Office Action from corresponding CN Application No. 2016800326319, dated Mar. 18, 2019, pp. 1-6.
(Continued)

*Primary Examiner* — Jacob M Amick
(74) *Attorney, Agent, or Firm* — Foley & Lardner LLP (57) ABSTRACT

Various example embodiments relate to rotating coalescers. One embodiment includes a housing comprising a first housing section having a blowby gas inlet structured to receive crankcase blowby gases from a crankcase. The housing further comprises an oil outlet. The rotating coalescer includes an endcap and filter media. The filter media is arranged in a cylindrical shape and is coupled to and positioned between the first housing section and endcap. The filter media is structured to filter the crankcase blowby gases passing through the filter media by coalescing and separating oils and aerosols contained in the crankcase blowby gases. The rotating coalescer includes a hollow shaft extending through the housing and positioned radially inside of the filter media. The hollow shaft forms a blowby gas outlet structured to route filtered crankcase blowby gases out of the housing. The rotating coalescer further includes a drive mechanism operatively coupled to the hollow shaft.

20 Claims, 8 Drawing Sheets

Related U.S. Application Data continuation of application No. 16/096,585, filed as application No. PCT/US2017/029315 on Apr. 25, 2017, now Pat. No. 10,711,669.

(60) Provisional application No. 62/328,880, filed on Apr. 28, 2016.

(51) Int. Cl.
    *B01D 46/00*    (2006.01)
    *B01D 50/00*    (2006.01)
    *B04B 15/10*    (2006.01)
    *B04B 5/00*    (2006.01)

(52) U.S. Cl.
CPC ..... *B01D 46/0031* (2013.01); *B01D 46/0056* (2013.01); *B01D 50/002* (2013.01); *B04B 5/005* (2013.01); *B04B 15/10* (2013.01); *B01D 2265/028* (2013.01); *B01D 2271/027* (2013.01); *B01D 2279/35* (2013.01); *F01M 2013/0422* (2013.01); *F01M 2013/0438* (2013.01)

(58) Field of Classification Search
CPC .............. B01D 46/005; B01D 46/0031; B01D 46/0005; B01D 46/0056; B04B 5/005; B04B 15/10
See application file for complete search history.

(56) References Cited

U.S. PATENT DOCUMENTS

| | | | |
|---|---|---|---|
| 2,937,755 | A | 5/1960 | Szwargulski |
| 3,234,716 | A | 2/1966 | Sevin et al. |
| 3,362,155 | A | 1/1968 | Driscoll |
| 3,451,551 | A | 6/1969 | Sample et al. |
| 3,531,897 | A | 10/1970 | Weimar |
| 4,189,310 | A | 2/1980 | Hotta |
| 4,279,630 | A | 7/1981 | Nakamura et al. |
| 4,482,365 | A | 11/1984 | Roach |
| 4,487,618 | A | 12/1984 | Mann |
| 4,502,956 | A | 3/1985 | Wilson et al. |
| 4,514,193 | A | 4/1985 | Booth |
| 4,516,994 | A | 5/1985 | Kocher |
| 4,981,502 | A | 1/1991 | Gottschalk |
| 5,056,935 | A | 10/1991 | Singh |
| 5,401,706 | A | 3/1995 | Fischer |
| 5,462,658 | A | 10/1995 | Sem |
| 5,466,385 | A | 11/1995 | Rogers et al. |
| 5,716,423 | A | 2/1998 | Krul et al. |
| 5,863,317 | A | 1/1999 | Smith et al. |
| 6,033,450 | A | 3/2000 | Krul et al. |
| 6,123,061 | A | 9/2000 | Baker et al. |
| 6,139,595 | A | 10/2000 | Herman et al. |
| 6,183,407 | B1 | 2/2001 | Hallgren et al. |
| 6,499,285 | B1 | 12/2002 | Snyder |
| 6,517,612 | B1 | 2/2003 | Crouch et al. |
| 6,640,792 | B2 | 11/2003 | Harvey et al. |
| 6,652,439 | B2 | 11/2003 | Herman et al. |
| 6,709,477 | B1* | 3/2004 | Hakansson ............ B01D 45/14 123/573 |
| 6,876,760 | B1 | 4/2005 | Vaisberg et al. |
| 7,235,177 | B2 | 6/2007 | Herman et al. |
| 7,811,347 | B2 | 10/2010 | Carlsson et al. |
| 7,824,458 | B2 | 11/2010 | Borgstrom et al. |
| 7,824,459 | B2 | 11/2010 | Borgstrom et al. |
| 8,172,917 | B2 | 5/2012 | Kup et al. |
| 8,231,752 | B2 | 7/2012 | Janikowski et al. |
| 8,268,033 | B2 | 9/2012 | Rogers et al. |
| 8,794,222 | B2 | 8/2014 | Schwandt et al. |
| 8,974,567 | B2 | 3/2015 | Verdegan et al. |
| 10,927,730 | B2* | 2/2021 | Barreteau ............ B04B 15/10 |
| 2003/0034016 | A1 | 2/2003 | Harvey et al. |
| 2004/0016345 | A1 | 1/2004 | Springett et al. |
| 2004/0020839 | A1 | 2/2004 | Kato et al. |
| 2004/0071328 | A1 | 4/2004 | Vaisberg et al. |
| 2004/0214710 | A1 | 10/2004 | Herman et al. |
| 2006/0096263 | A1 | 5/2006 | Kahlbaugh et al. |
| 2006/0242933 | A1 | 11/2006 | Webb et al. |
| 2007/0039300 | A1 | 2/2007 | Kahlbaugh et al. |
| 2007/0175191 | A1 | 8/2007 | Ziebold et al. |
| 2007/0249479 | A1 | 10/2007 | Eliasson et al. |
| 2007/0271884 | A1 | 11/2007 | Pearson et al. |
| 2008/0280777 | A1 | 11/2008 | Bittner et al. |
| 2009/0000258 | A1 | 1/2009 | Carlsson et al. |
| 2009/0020486 | A1 | 1/2009 | Barnwell |
| 2009/0044702 | A1 | 2/2009 | Adamek et al. |
| 2009/0056292 | A1 | 3/2009 | Fornof et al. |
| 2009/0067986 | A1 | 3/2009 | Mignano |
| 2009/0101013 | A1 | 4/2009 | Moredock |
| 2009/0263238 | A1 | 10/2009 | Jarrah |
| 2010/0126145 | A1 | 5/2010 | He et al. |
| 2010/0180854 | A1 | 7/2010 | Baumann et al. |
| 2010/0192529 | A1 | 8/2010 | Schuster |
| 2010/0229511 | A1 | 9/2010 | Steins et al. |
| 2010/0285101 | A1 | 11/2010 | Moore et al. |
| 2011/0180051 | A1 | 7/2011 | Schwandt et al. |
| 2011/0198280 | A1 | 8/2011 | Jones et al. |
| 2011/0247309 | A1* | 10/2011 | Smith ...................... B04B 7/12 55/447 |
| 2011/0252974 | A1 | 10/2011 | Verdegan et al. |
| 2011/0263496 | A1 | 10/2011 | Fineman et al. |
| 2012/0034083 | A1 | 2/2012 | Shoji et al. |
| 2012/0118200 | A1 | 5/2012 | Howell et al. |
| 2012/0315225 | A1 | 12/2012 | Porbeni et al. |
| 2013/0037481 | A1 | 2/2013 | Lalouch et al. |
| 2013/0056407 | A1 | 3/2013 | Parikh et al. |
| 2013/0167816 | A1 | 7/2013 | Dawar et al. |
| 2014/0033668 | A1 | 2/2014 | Kleynen |
| 2014/0069432 | A1 | 3/2014 | Mebasser et al. |
| 2014/0096683 | A1 | 4/2014 | Azwell et al. |
| 2014/0326661 | A1 | 11/2014 | Madsen et al. |
| 2015/0047582 | A1 | 2/2015 | Dawar et al. |
| 2015/0075377 | A1 | 3/2015 | Gorbach et al. |
| 2015/0173577 | A1 | 6/2015 | Kim et al. |
| 2016/0030875 | A1 | 2/2016 | Parikh et al. |
| 2016/0245157 | A1 | 8/2016 | Wilkins et al. |
| 2018/0030868 | A1 | 2/2018 | Elsaesser et al. |
| 2018/0117512 | A1 | 5/2018 | Janakiraman et al. |
| 2019/0153635 | A1 | 5/2019 | Ikejiri et al. |

FOREIGN PATENT DOCUMENTS

| | | |
|---|---|---|
| CN | 102596358 A | 7/2012 |
| CN | 104334284 A | 2/2015 |
| DE | 10044615 A1 | 4/2002 |
| DE | 20302824 U1 | 8/2004 |
| DE | 10 2006 024 816 A1 | 12/2007 |
| EP | 1 532 352 A1 | 5/2005 |
| EP | 1 645 320 A1 | 4/2006 |
| FR | 2933626 A1 | 1/2010 |
| JP | h11-141325 A | 5/1999 |
| WO | WO-2011/100712 A1 | 8/2011 |
| WO | WO-2012/106659 A1 | 8/2012 |
| WO | WO-2013/025445 A2 | 2/2013 |
| WO | WO-2016/046944 A1 | 3/2016 |
| WO | WO-2016/159951 A1 | 10/2016 |
| WO | WO-2017/189516 A1 | 11/2017 |
| WO | WO-2018/002244 A1 | 1/2018 |

OTHER PUBLICATIONS

Extended European Search Report for European Patent App. No. 17790235.0 dated Oct. 25, 2019, 9 pages.
Final Office Action issued for U.S. Appl. No. 15/580,481, dated Aug. 17, 2020, 27 pages.
First Examination Report for IN Patent App. No. 201747040072 dated Feb. 20, 2020, 9 pages.
First Examination Report for Indian Patent App. No. 201847007059 dated May 5, 2020, 6 pages.
First Office Action for Chinese Patent App. No. 2015800784030 dated Mar. 1, 2019, 19 pages (with translation).

(56) References Cited

OTHER PUBLICATIONS

First Office Action for Chinese Patent App. No. 2015800784030 dated Sep. 2, 2019, 26 pages (with translation).
First Office Action for Chinese Patent App. No. 2016800321512 dated May 14, 2019, 11 pages (with translation).
First Office Action for Chinese Patent App. No. 201680046338.8 dated Jun. 26, 2019, 17 pages (with translation).
First Office Action for Chinese Patent App. No. 201780024820.6 dated Mar. 31, 2020, 22 pages (with translation).
Holdich, "Centrifugal separation," Fundamentals of Particle Technology, Midland Information Technology and Publishing, pp. 77-90 (2002).
International Search Report and Written Opinion for PCT/US2015/023290, dated Jun. 29, 2015, 9 pages.
International Search Report and Written Opinion for PCT/US2016/036384, dated Aug. 25, 2016, 9 pages.
International Search Report and Written Opinion for PCT/US2016/036432, dated Aug. 31, 2016, 13 pages.
International Search Report and Written Opinion for PCT/US2016/047755, dated Nov. 4, 2016, 10 pages.
International Search Report and Written Opinion for PCT/US2016/048912, dated Nov. 10, 2016, 6 pages.
International Search Report and Written Opinion for PCT/US2017/029315, dated Aug. 1, 2017, 11 pages.
Non-Final Office Action on U.S. Appl. No. 15/580,481 dated Feb. 14, 2020.
Office Action for U.S. Appl. No. 15/746,973 dated Jul. 8, 2020, 34 pages.
Non-Final Office Action issued for U.S. Appl. No. 15/580,481 dated May 3, 2021, 20 pages.

* cited by examiner

INSIDE-OUT ROTATING COALESCER WITH GAS EXIT THROUGH HOLLOW SHAFT

CROSS REFERENCE TO RELATED APPLICATIONS

The present application is a Continuation of U.S. patent application Ser. No. 16/903,160, filed Jun. 16, 2020, which is a Continuation of U.S. patent application Ser. No. 16/096,585, filed Oct. 25, 2018, now U.S. Pat. No. 10,711,669, which is a National Stage of PCT Application No. PCT/US2017/029315, filed Apr. 25, 2017, which claims the benefit of priority to U.S. Provisional Patent Application No. 62/328,880, filed Apr. 28, 2016. The contents of these applications are incorporated herein by reference in their entirety.

TECHNICAL FIELD

The present application relates to crankcase ventilation systems.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the blowby gases can potentially harm the environment and/or may be subject to government emissions regulations. Accordingly, the blowby gases are typically routed out of the crankcase via a crankcase ventilation system. The crankcase ventilation system may pass the blowby gases through a coalescer (i.e., a coalescing filter element) to remove a majority of the aerosols and oils contained in the blowby gases. The coalescer includes filter media. The filtered blowby gases are then either vented to the ambient (in open crankcase ventilation systems) or routed back to the air intake for the internal combustion engine for further combustion (in closed crankcase ventilation systems).

Some crankcase ventilation systems utilize rotating coalescers that increase the filter efficiency of the coalescing filter elements by rotating the filter media during filtering. In rotating filter cartridges, the contaminants (e.g., oil droplets suspended and transported by blowby gases) are separated inside the filter media of the filter cartridge through the particle capture mechanisms of inertial impaction, interception, diffusion, and gravitational forces onto the fibers. By rotating the filter media, inertial impaction and gravitational forces are enhanced by the additional centrifugal force. Additionally, the rotation of the filter cartridge can create a pumping effect, which reduces the pressure drop through the filtration system. Rotating filter cartridges may include fibrous filters as well as centrifugal separation devices. However, many rotating coalescers are configured for outside-in flow through the filter media for ease of integration into engine compartments and crankcases. However, outside-in flow rotating coalescers suffer from high pressure drops and reduced fractional efficiency compared to inside-out flow rotating coalescers.

SUMMARY

Various example embodiments relate to rotating coalescers. One such rotating coalescer includes a housing comprising a first housing section having a blowby gas inlet structured to receive crankcase blowby gases from a crankcase. The housing further comprises an oil outlet. The rotating coalescer includes an endcap and filter media. The filter media is arranged in a cylindrical shape. The filter media is coupled to and positioned between the first housing section and the endcap. The filter media is structured to filter the crankcase blowby gases passing through the filter media by coalescing and separating oils and aerosols contained in the crankcase blowby gases. The rotating coalescer includes a hollow shaft extending through the housing and positioned radially inside of the filter media. The hollow shaft forms a blowby gas outlet structured to route filtered crankcase blowby gases out of the housing. The rotating coalescer further includes a drive mechanism operatively coupled to the hollow shaft. The drive mechanism is structured to rotate the hollow shaft and the housing.

Various other example embodiments relate to a method of filtering a fluid. The method includes rotating the coalescer with a drive mechanism. The coalescer comprises a housing, an endcap, a filter media coupled to the housing and the endcap, and a hollow shaft extending through the housing and positioned radially inside of the filter media, and the drive mechanism is operatively connected to the hollow shaft. The method further includes receiving crankcase blowby gases from a crankcase through an inlet of the housing of the coalescer. The crankcase blowby gases is passed radially through the filter media in an inside-out flow. The crankcase blowby gases is filtered through the filter media. The crankcase blowby gases is passed to the hollow shaft, wherein the filtered crankcase blowby gases are radially inside of the filter media with respect to the central axis. The filtered crankcase blowby gases is routed out of the housing through a blowsy gas outlet formed in the hollow shaft.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, variations of a rotating coalescer having an inside-out flow path are described. In some arrangements, a rotating coalescer receives blowby gases to be filtered from a crankcase of an internal combustion engine. The blowby gases are routed into inlet openings in the housing of the rotating coalescer, through filter media in an inside-out manner, and out an inner outlet formed in a hollow shaft. Separated oils and aerosols may be drained from the housing through a drain or a wick (such as a nylon wick). The described inside-out rotating coalescers result in a lower restriction (e.g., pressure drop) and higher separating efficiency than outside-in rotating coalescers.

Figure 1:
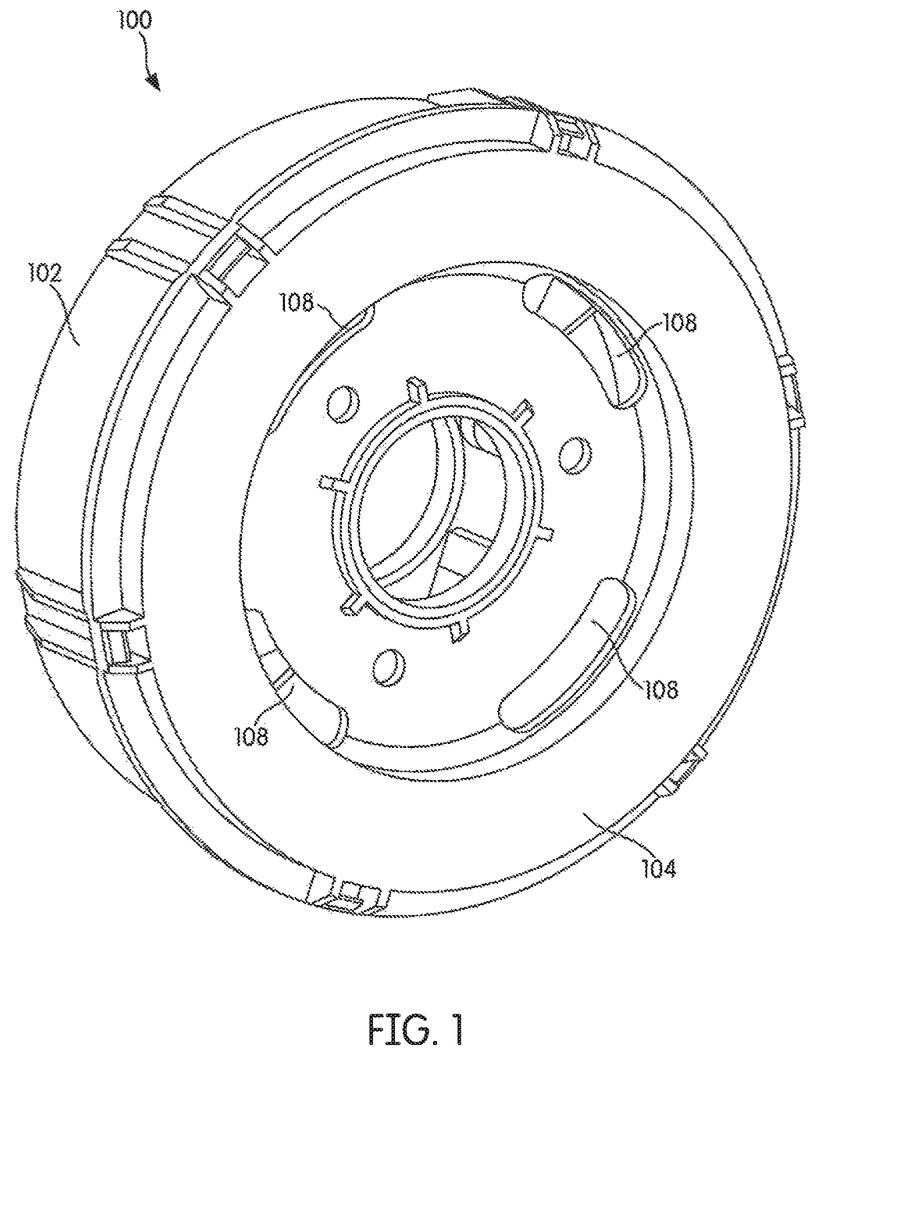
FIG. 1 shows a perspective view of a rotating coalescer according to an example embodiment.
Figure 2:
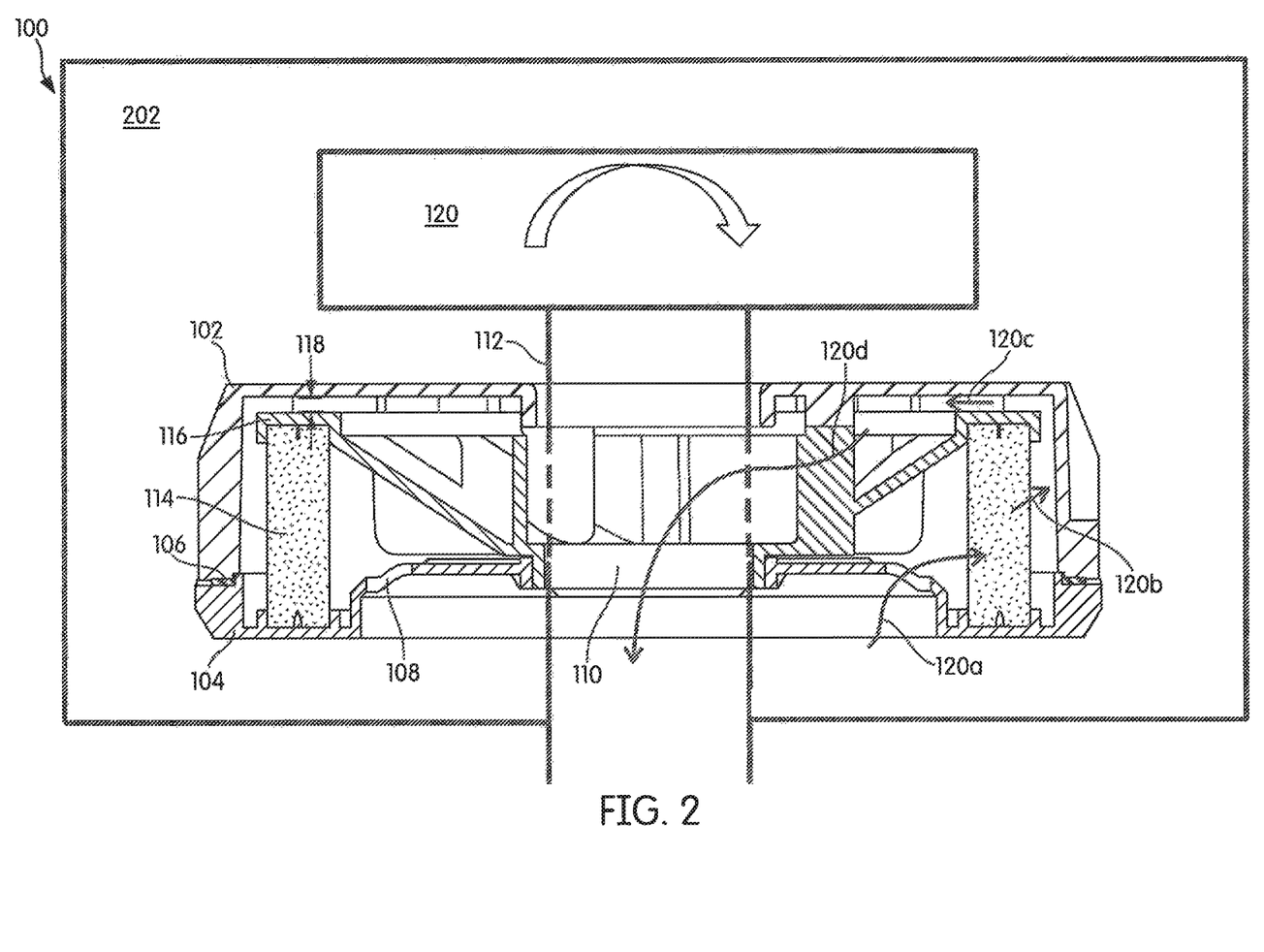
FIG. 2 shows a cross-sectional view of the rotating coalescer of FIG. 1.

Referring to FIG. 1, a perspective view of a rotating coalescer 100 is shown according to an example embodiment. Referring to FIG. 2, a cross-sectional view of the rotating coalescer 100 is shown. The rotating coalescer 100 includes a two-part housing having a first housing section 104 and a second housing section 102. The first housing section 104 and the second housing section 102 are removably secured together (e.g., via a snap-fit connection) to form the housing. In some arrangements, the housing is cylindrical in shape. As shown best in FIG. 2, a plurality of openings 106 exist between the first housing section 104 and the second housing section 102 at a circumferential surface of the housing. In some arrangements, a seal member may be placed in the openings 106 to prevent gases and oil from escaping through the openings 106. In other arrangements, and as described in further detail below, a wicking device (e.g., a nylon rope) that allows separated oil to drain from the housing through the openings 106 while preventing blowby gases from entering the housing through the openings 106 between the first housing section 104 and the second housing section 102. In such arrangements, the openings 106 function as oil drains.

The housing includes a plurality of inlets 108 and an outlet 110. The inlets 108 receive blowby gases from a crankcase 202 of an internal combustion engine (e.g., a diesel internal combustion engine). In some arrangements, the inlets 108 are formed in an axial surface of the first housing section 104. The blowby gases may include oils and aerosol. As described in further detail below, the outlet 110 routes filtered blowby gas through a hollow shaft 112. The hollow shaft 112 extends through the housing and defines a central axis of the rotating coalescer 100. As described in further detail below, during operation, the rotating coalescer 100 is rotated about the central axis.

As shown best in FIG. 2, the rotating coalescer 100 includes filter media 114 positioned within the housing. In the arrangement shown in FIG. 2, the filter media 114 is arranged in a cylindrical shape. The filter media 114 may comprise a coalescing fibrous filter media. The filter media 114 is secured between the first housing section 104 and an endcap 116. In some arrangements, the endcap 116 and the first housing section 104 include channels that receive the filter media 114. The filter media 114 is structured to filter blowby gases passing through the filter media 114 by coalescing and separating oils and aerosols contained in the blowby gases from the blowby gas. The filter media 114 is sealed with respect to the endcap 116 and with respect to the first housing section 104 such that blowby gas flowing through the inlets 108 cannot bypass the filter media 114 before exiting the housing through the outlet 110. The endcap 116 is spaced apart from the second housing section 102 such that a gap 118 exists between the second housing section 102 and the endcap 116. As described in further detail below, the gap 118 forms a flow channel that routes filtered blowby gases to the hollow shaft 112 and the outlet 110.

The rotating coalescer 100 includes a drive mechanism 120. The drive mechanism 120 is structured to rotate the rotating coalescer 100 about the central axis. The drive mechanism 120 may be, for example, gear drive, an electric motor, a hydraulic drive, or the like. The drive mechanism 120 is operatively and rotationally coupled to the hollow shaft 112. The hollow shaft 112 is rotationally coupled to the housing of the rotating coalescer 100. In some arrangements, the hollow shaft 112 is rotationally coupled to the second housing section 102. In other arrangements, the hollow shaft 112 is rotationally coupled to the first housing section 104. In further arrangements, the hollow shaft 112 is rotationally coupled to the endcap 116. In each of the arrangements, when the drive mechanism 120 rotates, the hollow shaft 112 rotates, and the hollow shaft 112 rotates the rotating coalescer 100 rotates.

During operation, the drive mechanism 120 rotates the rotating coalescer 100. The flow of the blowby gases through the rotating coalescer 100 are shown by the flow arrows 120a through 120d. Blowby gases enter the inlets 108 from the crankcase 202 (as shown by the flow arrow 120a), The inlets 108 are positioned radially inside of the filter media 114 with respect to the central axis. The blowby gases are then passed through the filter media 114 in an inside-out manner (as shown by the flow arrow 120b). At this point, the filtered blowby gases are radially outside of the filter media 114 with respect to the central axis. The filtered blowby gases then pass through the gap 118 (as shown by the flow arrow 120c). After passing through the gap 118, the filtered blowby gases return to being radially inside of the filter media 114 with respect to the central axis and then enter the hollow shaft 112 (e.g., through openings in the hollow shaft, such as perforations 122). Once inside of the hollow shaft 112, the filtered blowby gases flaw through the hollow shaft 112 out of the rotating coalescer 100 via the outlet 110 (as shown by the flow arrow 120d). The hollow shaft 112 may route the filtered blowby gases to the ambient or into an air intake system of the internal combustion engine. As the blowby gases are filtered through the rotating coalescer 100, oil and aerosol is separated from the blowby gases. In some arrangements, the openings 106 include a rope wick (e.g., a rope wick made from nylon) that prevents blowby gases from entering the rotating coalescer 100 downstream of the filter media 114 but allows for separated oil and aerosol to wick out of the housing assisted by the rotation of the rotating coalescer 100.

Figure 3:
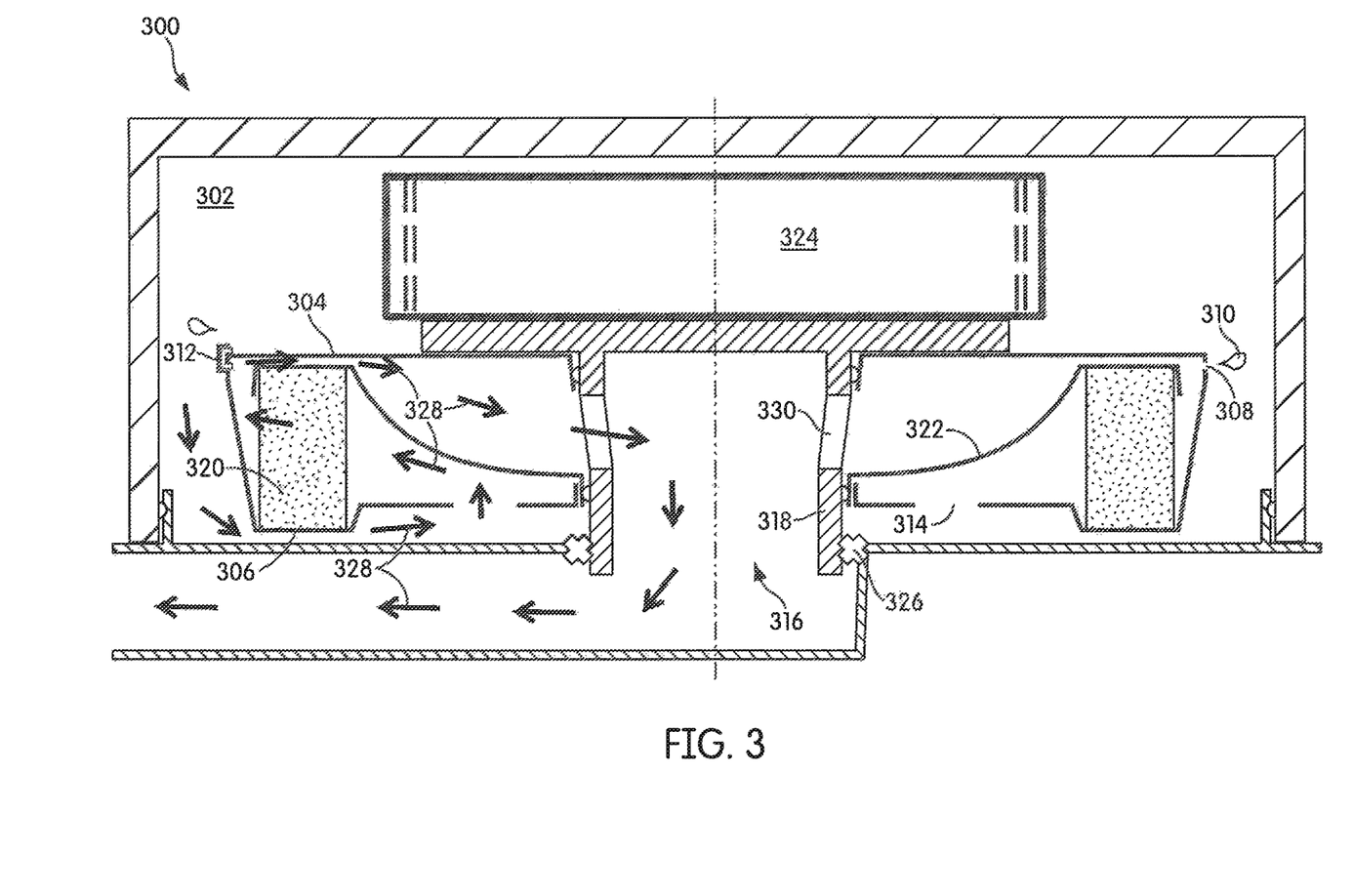
FIG. 3 shows a cross-sectional view of a rotating coalescer according to another example embodiment.

Referring to FIG. 3, a cross-sectional view of a rotating coalescer 300 is shown according to another example embodiment. The rotating coalescer 300 is similar to the rotating coalescer 100. The primary difference between the rotating coalescer 300 and the rotating coalescer 100 is the way the separated oil drains from the housing of the rotating coalescer 300. The rotating coalescer 300 is positioned within a crankcase 302. The rotating coalescer 300 includes a two-part housing having a first housing section 306 and a second housing section 304. The first housing section 306 and the second housing section 304 are removably secured together (e.g., via a snap-fit connection) to form the housing. In some arrangements, the housing is cylindrical in shape. A plurality of openings 308 exist between the first housing section 306 and the second housing section 304. The plurality of openings 308 are formed in a circumferential surface of the housing. The openings 308 allow separated oil and aerosol 310 to exit the housing during operation of the rotating coalescer 300. In some arrangements, the openings 308 are covered by an oil pot 312. The oil pot 312 is a U-shaped or C-shaped channel that collects oil and prevents blowby gases from entering the housing through the openings 308.

The housing includes a plurality of inlets 314 and an outlet 316. In some arrangements, the inlets 314 are formed in a surface of the first housing section 306. The inlets 314 receive blowby gases from the crankcase 302 of an internal combustion engine (e.g., a diesel internal combustion engine). The blowby gases may include oils and aerosol 310. As described in further detail below, the outlet 316 routes filtered blowby gas through a hollow shaft 318. The hollow shaft 318 extends through the housing and defines a central axis of the rotating coalescer 300. As described in further detail below, during operation, the rotating coalescer 300 is rotated about the central axis.

The rotating coalescer 300 includes filter media 320 positioned within the housing. In the embodiment depicted in FIG. 3, the filter media 320 is arranged in a cylindrical shape. The filter media 320 may comprise a coalescing fibrous filter media. The filter media 320 is structured to filter blowby gases passing through the filter media 320 by coalescing and separating oils and aerosols 310 contained in the blowby gases from the blowby bases. The filter media 320 is secured between the first housing section 306 and an endcap 322. In some arrangements, the endcap 322 and the first housing section 306 each include channels that receive the filter media 320. The filter media 320 is sealed with respect to the endcap 322 and with respect to the first housing section 306 such that blowby gas flowing through the inlets 314 cannot bypass the filter media 320 before exiting the housing through the outlet 316. The endcap 322 is spaced apart from the second housing section 304 such that a gap exists between the second housing section 304 and the endcap 322. As described in further detail below, the gap forms a flow channel that routes filtered blowby gases to the hollow shaft 318 and the outlet 316.

The rotating coalescer 300 includes a drive mechanism 324. The drive mechanism 324 is structured to rotate the rotating coalescer 300 about the central axis. The drive mechanism 324 may be, for example, gear drive, an electric motor, a hydraulic, or the like. The drive mechanism 324 is operatively and rotationally coupled to the hollow shaft 318. The hollow shaft 318 is rotationally coupled to the housing of the rotating coalescer 300. In some arrangements, the hollow shaft 318 is rotationally coupled to at least one of the second housing section 304, the first housing section 306, the endcap 322, or a combination thereof. Accordingly, when the drive mechanism 324 rotates, the hollow shaft 318 rotates, which imparts rotation on the rotating coalescer 300. A lip seal 326 may be positioned between the hollow shaft 318 and the crankcase housing adjacent to the outlet 316.

During operation, the drive mechanism 324 rotates the rotating coalescer 300. The flow of the blowby gases through the rotating coalescer 300 is shown by the flow arrows 328. Blowby gases enter the inlets 314 of the housing from the crankcase 302. The inlets 314 are positioned radially inside of the filter media 320 with respect to the central axis. The blowby gases are then passed through the filter media 320 in an inside-out manner. At this point, the filtered blowby gases are radially outside of the filter media 320 with respect to the central axis. The filtered blowby gases then pass through the gap between the endcap 322 and the second housing section 304. After passing through the gap, the filtered blowby gases return to being radially inside of the filter media 320 with respect to the central axis and then enter the hollow shaft 318 (e.g., through openings 330 in the hollow shaft 318). Once inside of the hollow shaft 318, the filtered blowby gases flow through the hollow shaft 318 out of the rotating coalescer 300 via the outlet 316. The hollow shaft 318 may route the filtered blowby gases to the ambient or into an air intake system of the internal combustion engine. As the blowby gases are filtered through the rotating coalescer 300, oil and aerosol 310 is separated from the blowby gases. The separated oil and aerosol 310 is returned to the crankcase 302 via the openings 308. In some arrangements, the separated oil and aerosol 310 accumulates in an oil pot 312 after passing through the openings 308.

Figure 4:
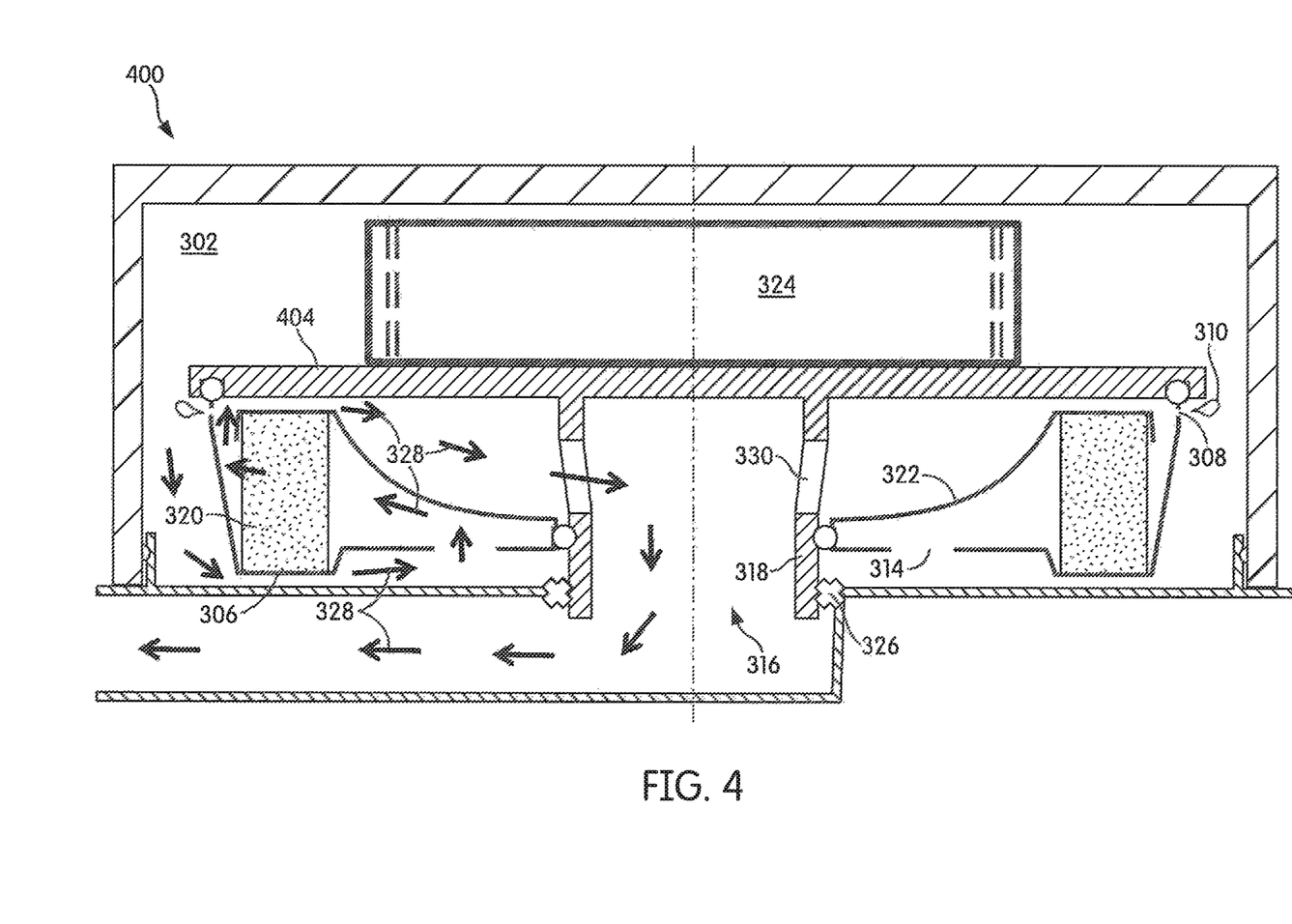
FIG. 4 shows a cross-sectional view of a rotating coalescer according to a further example embodiment.

Referring to FIG. 4, a cross-sectional view of a rotating coalescer 400 is shown according to still another example embodiment. The rotating coalescer 400 is similar to the rotating coalescer 300. A primary difference between the rotating coalescer 400 and the rotating coalescer 300 is the elimination of the second housing section 304 of the rotating coalescer 300. Accordingly, like numbering is used to designate like parts between the rotating coalescer 400 and the rotating coalescer 300.

The rotating coalescer 400 is positioned within a crankcase 302. The rotating coalescer 400 includes a two-pant housing formed by a first housing section 306 and a drive mechanism housing 404. In some arrangements, the first housing section 306 and the drive mechanism housing 404 are removably secured together (e.g., via a snap-fit connection) to form the housing. In some arrangements, the housing is cylindrical in shape. A plurality of openings 308 exist between the first housing section 306 and the drive mechanism housing 404. The plurality of openings 308 are formed in a circumferential surface of the housing. The openings 308 allow separated oil and aerosol 310 to exit the housing during operation of the rotating coalescer 400. In some arrangements, the openings 308 are covered by an oil pot 312 (e.g., as shown in FIG. 3). In such arrangements, the oil pot 312 is a U-shaped or C-shaped channel that collects oil and prevents blowby gases from entering the housing through the openings 308.

The housing includes a plurality of inlets 314 and an outlet 316. In some arrangements, the inlets 314 are formed in a surface of the first housing section 306. The inlets 314 receive blowby gases from the crankcase 302 of an internal combustion engine (e.g., a diesel internal combustion engine). The blowby gases may include oils and aerosol 310. As described in further detail below, the outlet 316 routes filtered blowby gas through a hollow shaft 318. The hollow shaft 318 extends through the housing and defines a central axis of the rotating coalescer 400. As described in further detail below, during operation, the rotating coalescer 400 is rotated about the central axis.

The rotating coalescer 400 includes filter media 320 positioned within the housing. In the embodiment depicted in FIG. 4, the filter media 320 is arranged in a cylindrical shape. The filter media 320 may comprise a coalescing fibrous filter media. The filter media 320 is structured to filter blowby gases passing through the filter media 320 by coalescing and separating oils and aerosols 310 contained in the blowby gases. The filter media 320 is secured between the first housing section 306 and an endcap 322. In some arrangements, the endcap 322 and the first housing section 306 each include channels that receive the filter media 320. The filter media 320 is sealed with respect to the endcap 322 and with respect to the first housing section 306 such that blowby gas flowing through the inlets 314 cannot bypass the filter media 320 before exiting the housing through the outlet 316. The endcap 322 is spaced apart from the drive mechanism housing 404 such that a gap exists between the drive mechanism housing 404 and the endcap 322. As described in further detail below, the gap forms a flow channel that routes filtered blowby gases to the hollow shaft 318 and the outlet 316.

The rotating coalescer 400 includes a drive mechanism 324. The drive mechanism 324 is structured to rotate the rotating coalescer 400 about the central axis. The drive mechanism 324 may be, for example, a gear drive, an electric motor, or the like. The drive mechanism 324 includes the drive mechanism housing 404. The drive mechanism housing 404 is rotationally operatively and coupled to drive mechanism 324 and to the hollow shaft 318. In some arrangements, the hollow shaft 318 is rotationally coupled to the first housing section 306. In further arrangements, the hollow shaft 318 is rotationally coupled to the endcap 322. Accordingly, when the drive mechanism 324 rotates, the drive mechanism housing 404 and the hollow shaft 318 also rotate, which thereby imparts rotation on the rotating coalescer 400. A lip seal 326 may be positioned between the hollow shaft 318 and the crankcase housing adjacent to the outlet 316.

During operation, the drive mechanism 324 rotates the rotating coalescer 400. The flow of the blowby gases through the rotating coalescer 400 is shown by the flow arrows 328. Blowby gases enter the inlets 314 of the housing from the crankcase 302. The inlets 314 are positioned radially inside of the filter media 320 with respect to the central axis. The blowby gases are then passed through the filter media 320 in an inside-out manner. At this point, the filtered blowby gases are radially outside of the filter media 320 with respect to the central axis. The filtered blowby gases then pass through the gap between the endcap 322 and the drive mechanism housing 404. After passing through the gap, the filtered blowby gases return to being radially inside of the filter media 320 with respect to the central axis and then enter the hollow shaft 318 (e.g., through openings 330 in the hollow shaft 318). Once inside of the hollow shaft 318, the filtered blowby gases flow through the hollow shaft 318 out of the rotating coalescer 400 via the outlet 316. The hollow shaft 318 may route the filtered blowby gases to the ambient or into an air intake system of the internal combustion engine. As the blowby gases are filtered through the rotating coalescer 400, oil and aerosol 310 is separated from the blowby gases. The separated oil and aerosol 310 is returned to the crankcase 302 via the openings 308. In some arrangements, the separated oil and aerosol 310 accumulates in an oil pot 312 after passing through the openings 308.

Figure 5:
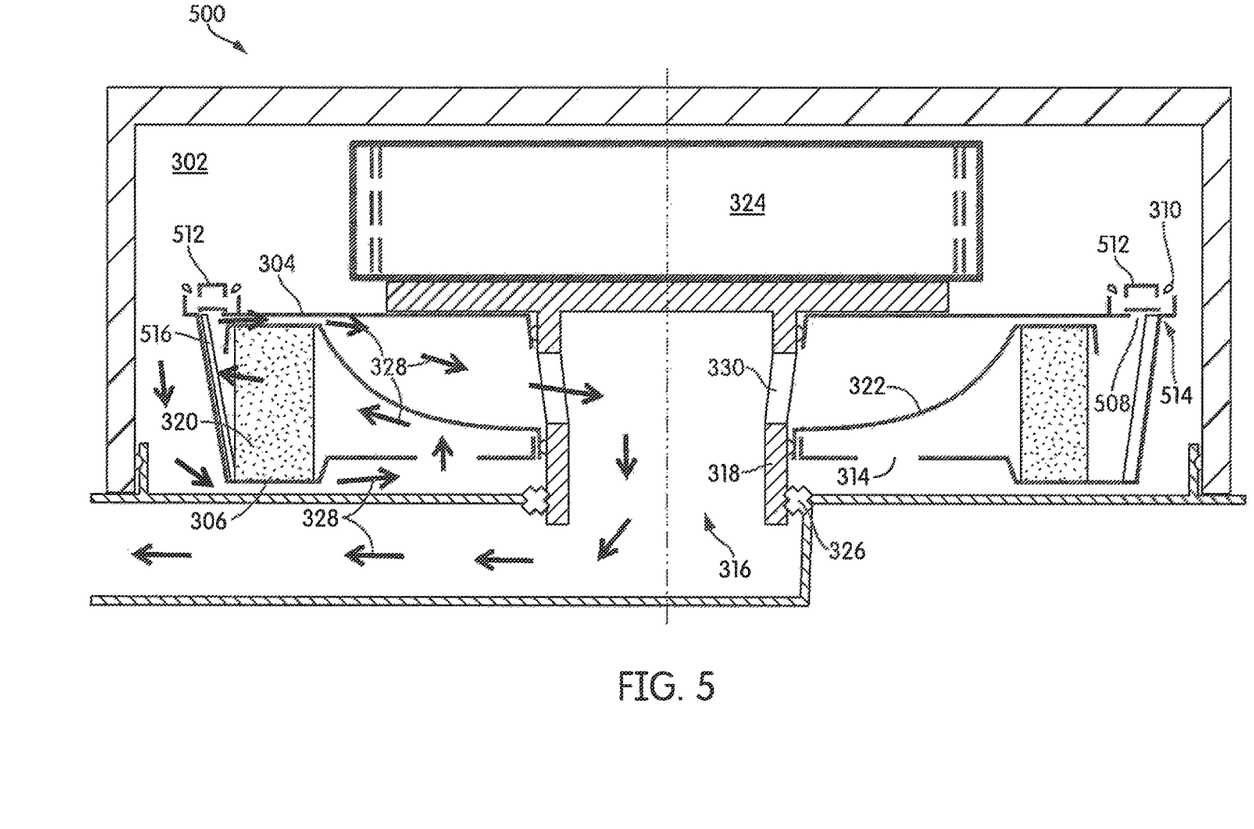
FIG. 5 shows a cross-sectional view of a rotating coalescer according to another example embodiment.

Referring to FIG. 5, a cross-sectional view of a rotating coalescer 500 is shown according to still another example embodiment. The rotating coalescer 500 is similar to the rotating coalescer 300. A primary difference between the rotating coalescer 500 and the rotating coalescer 300 is the use of check valves 512 in the housing of the rotating coalescer 500. Accordingly, like numbering is used to designate like parts between the rotating coalescer 500 and the rotating coalescer 300.

The rotating coalescer 500 is positioned within a crankcase 302. The rotating coalescer 500 includes a two-part housing having a first housing section 306 and a second housing section 304. The first housing section 306 and the second housing section 304 are removably secured together (e.g., via a snap-fit connection) to form the housing. In some arrangements, the housing is cylindrical in shape. A plurality of openings 508 exist between the first housing section 306 and the second housing section 304. The plurality of openings 508 are formed in a circumferential surface of the housing. The openings 508 allow the separated oil and aerosol 310 to exit the housing during, operation of the rotating coalescer 500. In some arrangements, the openings 508 are covered with a check valve 512. In some arrangements, a plurality of check valves 512 that are of the same part number, and therefore the same properties, are used to cover the plurality of openings 508.

The check valve 512 is structured to facilitate the drainage of the separated oil and aerosol 310 from the housing if the centrifugal force of the separated oil and aerosol 310 is sufficient to overcome the back pressure of the gas outside the check valve 512. If the centrifugal force of force of the separated oil and aerosol 310 is less than the back pressure of the gas outside of the check valve 512, the separated oil and aerosol 310 will form a film 516 of the separated oil and aerosol 310 along the side wall of the first housing section 306. When the pressure of the centrifugal force of the separated oil and aerosol 310 is greater than the back pressure of the gas outside of the check valve 512, the film 516 of the separated oil and aerosol 310 will drain and the separated oil and aerosol 310 will exit the housing through the openings 508 during operation of the rotating coalescer 500. As will be appreciated, the back pressure of the gas outside the check valve is dependent on the check valve 512 and operating conditions outside of the housing. The centrifugal force is dependent on an angle 514 of the side wall of the first housing section 306 and below the check valve 512, the rotation of the coalescer 500, the radius of the coalescer 500, and the mass of the separated oil and aerosol 310. For example, when the angle 514 of the side wall of the first housing section 306 is five degrees, the rotation of the coalescer 500 is 3000 rpm, the radius is 0.1 m, and the gas pressure ($F_p$) is 20 mbar (e.g. 200 kg/m$^2$), the centrifugal force ($F_c$) will overcome the gas pressure when the film 516 reaches a thickness (t) of 0.27 mm.

$$F_c > F_p$$

$$F_c = \text{mass} * \Omega^2 * R * \sin\alpha$$

$$F_p = P * S$$

$$\text{mass} = 850 \frac{\text{kg}}{\text{m}^3} * t * s$$

The housing includes a plurality of inlets 314 and an outlet 316. In some arrangements, the inlets 314 are formed in a surface of the first housing section 306. The inlets 314 receive blowby gases from the crankcase 302 of an internal combustion engine (e.g., a diesel internal combustion engine). The blowby gases may include oils and aerosol 310. As described in further detail below, the outlet 316 routes filtered blowby gas through a hollow shaft 318. The hollow shaft 318 extends through the housing and defines a central axis of the rotating coalescer 500. As described in further detail below, during operation, the rotating coalescer 500 is rotated about the central axis.

The rotating coalescer 500 includes filter media 320 positioned within the housing. In the embodiment depicted in FIG. 5, the filter media 320 is arranged in a cylindrical shape. The filter media 320 may comprise a coalescing fibrous filter media. The filter media 320 is structured to filter blowby gases passing through the filter media 320 by coalescing and separating oils and aerosols 310 contained in the blowby gases. The filter media 320 is secured between the first housing section 306 and an endcap 322. In some arrangements, the endcap 322 and the first housing section 306 each include channels that receive the filter media 320. The filter media 320 is sealed with respect to the endcap 322 and with respect to the first housing section 306 such that blowby gas flowing through the inlets 314 cannot bypass the filter media 320 before exiting the housing through the outlet 316. The endcap 322 is spaced apart from the second housing section 304 such that a gap exists between the second housing section 304 and the endcap 322. As described in further detail below, the gap forms a flow channel that routes filtered blowby gases to the hollow shaft 318 and the outlet 316.

The rotating coalescer 500 includes a drive mechanism 324. The drive mechanism 324 is structured to rotate the rotating coalescer 500 about the central axis. The drive mechanism 324 may be, for example, a gear drive, an electric motor, a hydraulic, or the like. The drive mechanism 324 is operatively and rotationally coupled to the hollow shaft 318. The hollow shaft 318 is rotationally coupled to the housing of the rotating coalescer 500. In some arrangements, the hollow shaft 318 is rotationally coupled to at least one of the second housing section 304, the first housing section 306, the endcap 322, or a combination thereof. Accordingly, when the drive mechanism 324 rotates, the hollow shaft 318 rotates, which imparts rotation on the rotating coalescer 500. A lip seal 326 may be positioned between the hollow shaft 318 and the crankcase housing adjacent to the outlet 316.

During operation, the drive mechanism 324 rotates the rotating coalescer 500. The flow of the blowby gases through the rotating coalescer 500 is shown by the flow arrows 328. Blowby gases enter the inlets 314 of the housing from the crankcase 302. The inlets 314 are positioned radially inside of the filter media 320 with respect to the central axis. The blowby gases are then passed through the filter media 320 in an inside-out manner. At this point, the filtered blowby gases are radially outside of the filter media 320 with respect to the central axis. The filtered blowby gases then pass through the gap between the endcap 322 and the second housing section 304. After passing through the gap, the filtered blowby gases return to being radially inside of the filter media 320 with respect to the central axis and then enter the hollow shaft 318 (e.g., through openings 330 in the hollow shaft 318). Once inside of the hollow shaft 318, the filtered blowby gases flow through the hollow shaft 318 out of the rotating coalescer 500 via the outlet 316. The hollow shaft 318 may route the filtered blowby gases to the ambient or into an air intake system of the internal combustion engine. As the blowby gases are filtered through the rotating coalescer 500, oil and aerosol 310 is separated from the blowby gases. The separated oil and aerosol 310 is returned to the crankcase 302 via the openings 508 if they can overcome the back pressure of the check valve 512.

Figure 6:
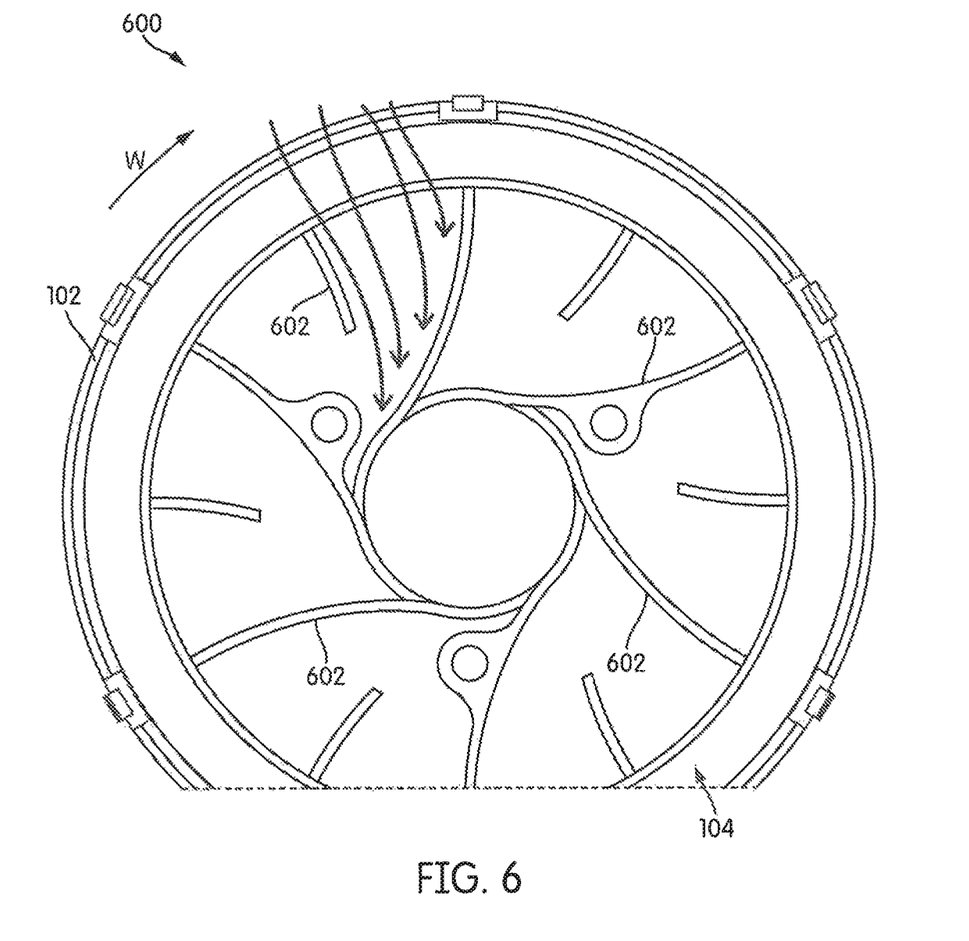
FIG. 6 shows a front plan view of a rotating coalescer according to a further example embodiment.

Referring to FIG. 6, a front plan view of a rotating coalescer 600 is shown according to still another example embodiment. The rotating coalescer 600 is similar to the rotating coalescer 100. A primary difference between the rotating coalescer 600 and the rotating coalescer 100 is the use of a plurality of vanes 602 inside the housing. Accordingly, like numbering is used to designate like parts between the rotating coalescer 600 and the rotating coalescer 100. In some embodiments, the plurality of vanes 602 are disposed along the inside surface of the first housing section 104. The plurality of vanes 602 are structured to optimize (e.g., reduce) pressure drop and laminar flow of the blowby gases that enter the inlets 108 from the crankcase 202 of an internal combustion engine.

Figure 7:
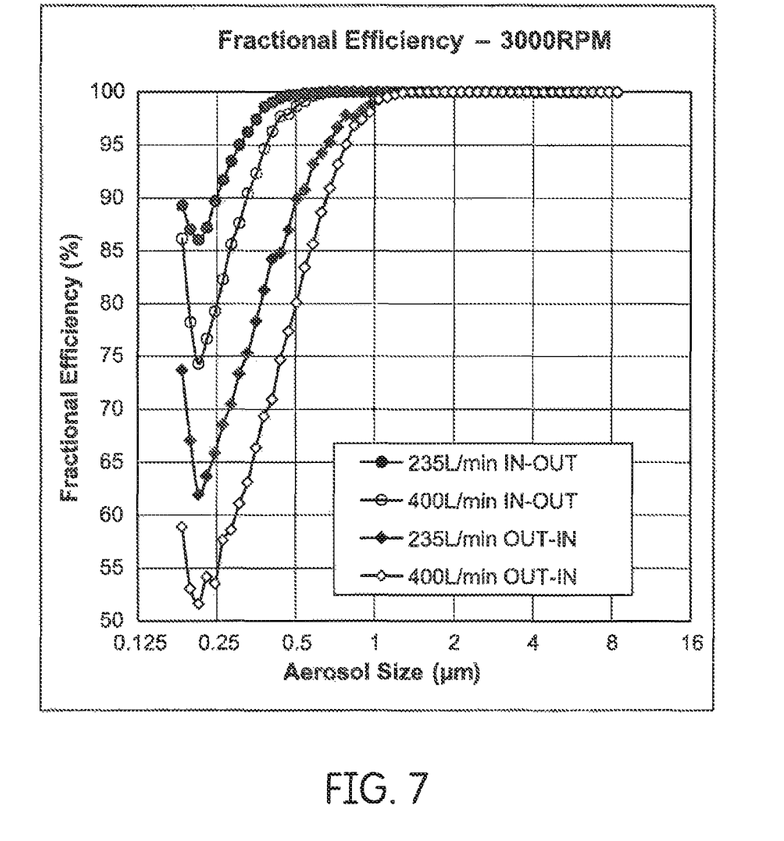
FIG. 7 shows a graph comparing fractional efficiency of inside-out rotating coalescers and outside-in rotating coalescers.
Figure 8:
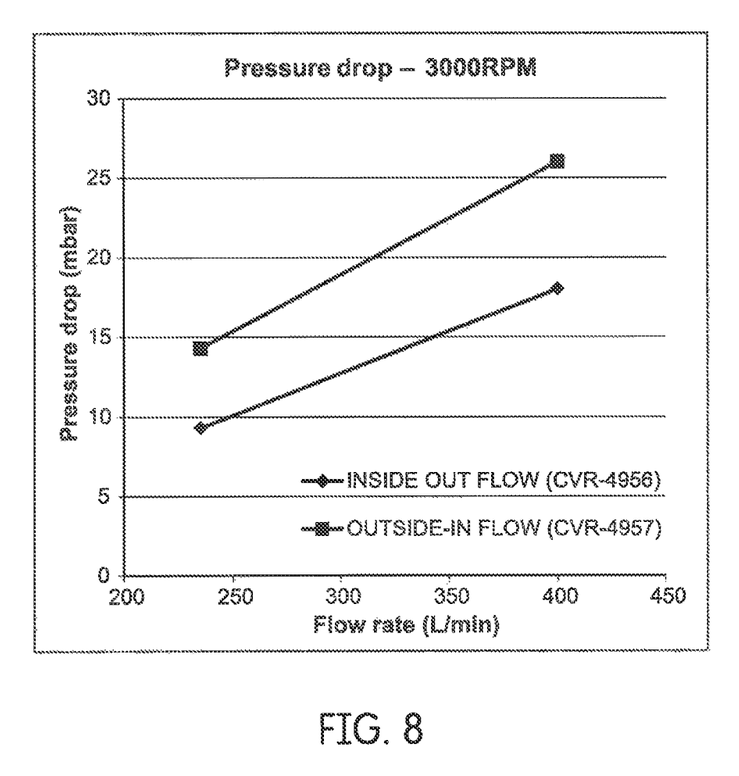
FIG. 8 shows a graph comparing pressure drop of inside-out rotating coalescers and outside-in rotating coalescers.

FIGS. 7 and 8 show graphs comparing the performance of inside-out rotating coalescers (e.g., the rotating coalescers 100, 300, 400, 500, and 600) to outside-in rotating coalescers. FIG. 7 shows a graph of fractional efficiency vs. aerosol size. FIG. 8 shows a graph of pressure drop vs. flow rate. As demonstrated in each of the graphs, the inside-out rotating coalescers are more efficient and cause a lower pressure drop than similarly configured outside-in rotating coalescers.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:
1. A rotating coalescer comprising:
   a housing comprising:
   a first housing section having a blowby gas inlet structured to receive crankcase blowby gases from a crankcase; and
   an oil outlet;
   an endcap;
   filter media arranged in a cylindrical shape, the filter media coupled to and positioned between the first housing section and the endcap, the filter media structured to receive unfiltered crankcase blowby gases after the unfiltered crankcase blowby gases pass axially through the blowby gas inlet in the first housing section and filter the crankcase blowby gases passing through the filter media by coalescing and separating oils and aerosols contained in the crankcase blowby gases before passing the crankcase blowby gas axially between the first housing section and the endcap;
   a hollow shaft extending through the housing and positioned radially inside of the filter media, the hollow shaft forming a blowby gas outlet structured to route the crankcase blowby gases filtered after passing through the filter media via the inner and outer surfaces of the filter media out of the housing; and a drive mechanism operatively coupled to the hollow shaft, the drive mechanism structured to rotate the hollow shaft and the housing.

2. The rotating coalescer of claim 1, further comprising an oil pot covering the oil outlet.

3. The rotating coalescer of claim 1, wherein the housing further comprises a plurality of vanes along an inside surface of the housing.

4. The rotating coalescer of claim 1, wherein the drive mechanism comprises at least one of a gear drive, an electric motor, and a hydraulic drive.

5. The rotating coalescer of claim 1, wherein the rotating coalescer is positioned within the crankcase.

6. The rotating coalescer of claim 1, wherein the hollow shaft is rotationally coupled to the first housing section.

7. The rotating coalescer of claim 1, wherein the hollow shaft is rotationally coupled to the endcap.

8. The rotating coalescer of claim 1, further comprising a second housing section removably coupled to the first housing section.

9. The rotating coalescer of claim 8, wherein the hollow shaft is rotationally coupled to the second housing section.

10. The rotating coalescer of claim 8, wherein the first housing section and the second housing section are removably coupled through a snap fit connection.

11. The rotating coalescer of claim 8, wherein the oil outlet is defined by a gap between the first housing section and the second housing section.

12. The rotating coalescer of claim 1, further comprising a lip seal disposed between the hollow shaft and the housing adjacent to the blowby gas outlet.

13. The rotating coalescer of claim 1, further comprising a check valve covering the oil outlet, the check valve facilitating drainage of separated oils and aerosols from the housing when a back pressure of gas outside of the check valve is overcome.

14. A method of filtering a fluid, the method comprising:
rotating a coalescer with a drive mechanism, the coalescer comprising a housing, an endcap, a filter media coupled to the housing and the endcap, and a hollow shaft extending through the housing and positioned radially inside of the filter media, wherein the drive mechanism is operatively connected to the hollow shaft;

receiving crankcase blowby gases from a crankcase axially through an inlet of the housing of the coalescer;

passing the crankcase blowby gases through the filter media;

filtering the crankcase blowby gases through the filter media;

passing the filtered crankcase blowby gases axially between the housing and the endcap to the hollow shaft, wherein the filtered crankcase blowby gases are radially inside of the filter media with respect to a central axis when received by the hollow shaft;

routing the filtered crankcase blowby gases out of the housing through a blowby gas outlet formed in the hollow shaft, wherein filtering the crankcase blowby gases through the filter media further includes separating oils and aerosols from the crankcase blowby gases; and draining the separated oils and aerosols through an oil outlet in the housing.

15. The method of claim 14, wherein the drive mechanism comprises an electric motor.

16. The method of claim 14, further comprising draining the separated oils and aerosols through an oil outlet in the housing.

17. The method of claim 14, wherein the housing comprises a first housing section removably coupled to a second housing section.

18. The method of claim 17, wherein the hollow shaft is rotationally coupled to the first housing section.

19. The method of claim 17, wherein the hollow shaft is rotationally coupled to the second housing section.

20. The method of claim 14, wherein the separated oils and aerosols are drained through a check valve disposed in the oil outlet in response to a back pressure of gas outside of the check valve being overcome.

* * * * *